United States Patent
Nigon et al.

(10) Patent No.: US 6,549,125 B2
(45) Date of Patent: Apr. 15, 2003

(54) TIRE CONDITION SENSOR UNIT MOUNTING ARRANGEMENT

(75) Inventors: Frederic Nigon, Andresy (FR); Robert Cheng, Paris (FR); Alain Ponsot, La Celle Saint-Cloud (FR); Kamel Renault, Le Vesinet (FR); Timothy DeZorzi, South Lyon, MI (US); Albert M. Straub, Ann Arbor, MI (US)

(73) Assignees: TRW Inc., Lyndhurst, OH (US); TRW France SA, Longvic (FR)

( * ) Notice: Subject to any disclaimer, the term of this patent is extended or adjusted under 35 U.S.C. 154(b) by 0 days.

(21) Appl. No.: 09/753,030

(22) Filed: Jan. 2, 2001

(65) Prior Publication Data

US 2001/0030601 A1 Oct. 18, 2001

(30) Foreign Application Priority Data

Apr. 7, 2000 (FR) ............................. 00 04490

(51) Int. Cl.[7] .............................................. B60C 23/00
(52) U.S. Cl. ....................... 340/447; 340/445; 73/146.5
(58) Field of Search ................................ 340/447, 445, 340/442, 448, 443, 444, 446; 73/146.4, 146.5; 200/61.23, 61.25; 343/713, 728; 116/34 R

(56) References Cited

U.S. PATENT DOCUMENTS

| | | | |
|---|---|---|---|
| 3,835,451 A | 9/1974 | Church | 340/447 |
| 4,384,482 A | 5/1983 | Snyder | 73/146.5 |
| 5,473,938 A | 12/1995 | Handfield et al. | 340/442 |
| 5,781,104 A | 7/1998 | Huang | 340/442 |
| 5,798,689 A | 8/1998 | Huang | 340/447 |
| 5,900,808 A | 5/1999 | Lebo | 340/442 |
| 5,924,055 A | 7/1999 | Hattori | 702/138 |
| 5,977,870 A | 11/1999 | Rensel et al. | 340/447 |
| 6,016,102 A | 1/2000 | Fortune et al. | 340/442 |
| 6,304,172 B1 * | 10/2001 | Katou et al. | 340/445 |
| 6,357,833 B1 * | 3/2002 | Bajer | 301/95 |

FOREIGN PATENT DOCUMENTS

FR 2661373 10/1991

OTHER PUBLICATIONS

A copy of the Search Report dated Jan. 10, 1991 citing the corresponding French patent application by the French Patent Office.
Brochure from AVCO Precision Products Division, entitled "TYRECHEK LOW TIRE PRESSURE MONORITING & WARNING SYSTEM", and having a lithography ID 473.
Brochure for AVCO Precision Products Division, entitled "TYRECHEK LOW TIRE PRESSURE WARNING SYSTEM".
PARTS, operating Guide, Installation Instructions from AVCO Precision Products Division, for TYRECHEK Low Tire Pressure Monitoring and Warning System, and having a printing ID 130–4373–OM.
Manual from AVCO Precision Products Division, for TYRECHEK Pneumatic Tire Low Pressure Warning System.

* cited by examiner

Primary Examiner—Daryl Pope
(74) Attorney, Agent, or Firm—Tarolli, Sundheim, Covell & Tummino L.L.P.

(57) ABSTRACT

An arrangement for provision of vehicle tire sensory information while a tire (12) is mounted on a wheel rim (10) of a vehicle. A sensor unit (16) includes a tire condition sensor (e.g., electronics 38), a signal transmitter (36), and a housing (20) that contains the sensor and the transmitter. The housing (20) has a mounting hole. A stud (18) is welded to the rim (10) and extends into the space bounded between the tire (12) and the rim (10). The stud extends through the mounting hole of the sensor housing (20). A retainer (e.g., 26) extends between the sensor housing (20) and the stud (18) such that the sensor housing is held fixed relative to the stud.

34 Claims, 3 Drawing Sheets

TIRE CONDITION SENSOR UNIT MOUNTING ARRANGEMENT

TECHNICAL FIELD

The present invention is generally directed to vehicle systems that have sensor units that sense tire condition parameters, such as tire pressure and tire temperature. Specifically, the present invention relates to mounting arrangements for sensor units with tires.

BACKGROUND OF THE INVENTION

Numerous tire condition monitoring systems have been developed in order to provide tire operation information to a vehicle operator. One example type of a tire condition monitoring system is a tire pressure monitoring system that detects when air pressure within a tire drops below a predetermined threshold pressure value.

There is an increasing need for the use of tire pressure monitoring systems due to the increasing use of "run-flat" tires for vehicles such as automobiles. A run-flat tire enables a vehicle to travel an extended distance after significant loss of air pressure within that tire. However, a vehicle operator may have difficulty recognizing the significant loss of air pressure within the tire because the loss of air pressure may cause little change in vehicle handling and little change in the visual appearance of the tire.

Typically, a tire pressure monitoring system includes tire-based pressure sensing components, tire-based components that provide communication links from the tires to a central receiver, and an indicator or display located on a vehicle instrument panel. In particular, the tire-based components of such a tire pressure monitoring system are provided in sensor units located inside the tires. In one known system, the sensor units transmit radio frequency signals that are received via stationary antennas that are located near the tires.

In one known system, each sensor unit is attached to an air valve. In turn, the valve is attached to an associated rim such that the sensor unit is inside the associated tire. At first glance, this solution is acceptable since the valve constitutes a convenient anchoring point. But this solution has a disadvantage of being complex from a mechanical viewpoint, particularly for fastening the valve and attached sensor unit onto the rim prior to assembly of the tire.

Another known system utilizes straps to attach the sensor units to the rims. Each strap encircles the associated rim and is tight against the rim. However, mechanical complexity may also be an issue for the use of straps.

SUMMARY OF THE INVENTION

In general, the present invention provides a tire sensor unit that is easy to assemble, handle, and mount within a tire, and that does not interfere with an inflation valve for the tire.

In accordance with one aspect, the present invention provides a sensor unit that senses at least one physical parameter of a vehicle tire mounted on a wheel rim. The sensor unit has an element that detects the parameter, electronics that generate radio frequency messages that convey the value of the parameter, an emitting element, such as an antenna, and a source of electrical energy. The invention has a characteristic in that the sensor unit is incorporated in a box placed inside the space delineated by the rim and the tire and is fastened by at least one pin that is permanently joined to the rim and that inwardly protrudes in a radial direction.

In accordance with another aspect, the present invention provides an arrangement for provision of vehicle tire sensory information while a tire is mounted on a wheel rim of a vehicle. The arrangement includes a sensor unit. The sensor unit includes a tire condition sensor, a signal transmitter, and a housing that contains the sensor and the transmitter. The housing has a mounting hole. A stud is welded to the rim and extends into the space bounded between the tire and the rim. The stud extends through the mounting hole of the sensor housing. A retainer extends between the sensor housing and the stud such that the sensor housing is held fixed relative to the stud.

In accordance with another aspect, the present invention provides a method of attaching a tire condition sensor unit to a rim of a vehicle tire assembly. The sensor unit senses a tire condition parameter and transmits a signal indicative of the sensed parameter. A stud is welded directly to the rim to extend into a space bounded by the rim and a tire of the tire assembly. The tire condition sensor unit is located adjacent to the welded stud. A retaining component is engaged between the welded stud and the tire condition sensor unit.

BRIEF DESCRIPTION OF THE DRAWINGS

The foregoing and other features and advantages of the present invention will become apparent to those skilled in the art to which the present invention relates upon reading the following description with reference to the accompanying drawings, in which.

DESCRIPTION OF EXAMPLE EMBODIMENTS

Figure 1:
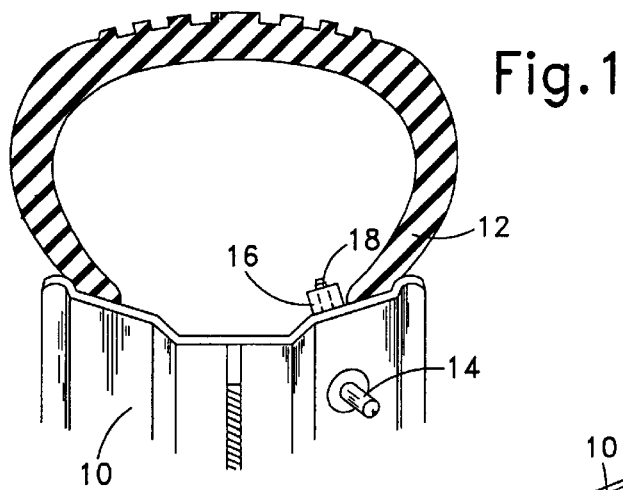
FIG. 1 is a schematic cross sectional view of a tire and a rim of a wheel assembly, with the section plane going through an axle of the rim, and shows a first arrangement in accordance with the present invention.

FIG. 1 shows a rim 10 of a vehicle wheel on which a tire 12 is mounted. A nozzle 14 that contains an air inflation valve passes through the rim 10. In the space delineated (i.e., bounded) by the rim 10 and the tire 12 is a pressure sensor unit 16 suitable for communicating, via radio frequency signals, with an antenna (not shown) operatively connected to a central processing unit (not shown). It is to be appreciated that tire pressure is one example of a tire parameter, and that different and/or additional parameter(s) may be sensed.

In accordance with the present invention, the sensor unit 16 is fixed relative to the rim 10 via one or more pins 18 (one visible) affixed to the rim. In the example arrangement shown in FIG. 1, the pin 18 is a stud that extends along a radial line of the rim 10. The pin 18 is fastened to the rim 10 by welding in accordance with a welding process that depends on the type of metal (e.g., steel, aluminum, etc.) comprising the rim.

Figure 2:
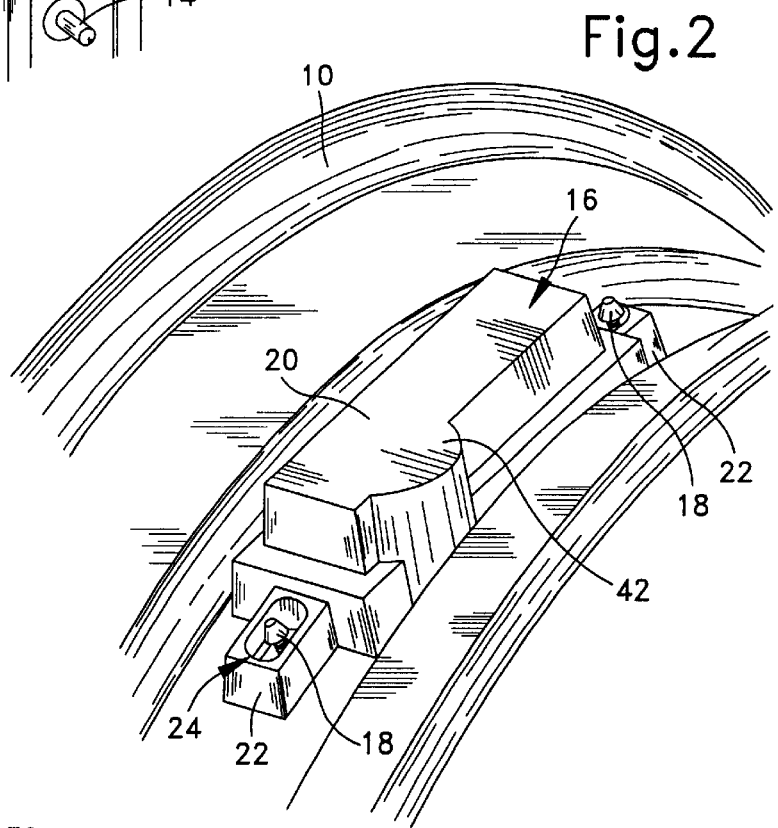
FIG. 2 is a perspective view of a second arrangement in accordance with the present invention, with a sensor unit and two pins.

In FIG. 2, wherein the elements corresponding or similar to those of FIG. 1 have the same reference numbers, the rim 10 has two pins (studs) 18 that are spaced apart and placed on the same rim circle, so that the sensor unit 16 is tangentially arranged in the circumferential direction. The sensor unit 16 has a housing box 20. In the shown example, the box 20 is made of plastic that is reinforced by non-conducting fillers. This material should be capable of withstanding maximum temperatures reached during operation, (e.g., on the order of at least 150° C.).

The box 20 has two extensions 22, each of which has a hole through which one of the pins 18 passes. The box 20 and the pins 18 have fastening means 24, generally of the type that snap on in order to lock the box onto the rim. In the example shown in FIG. 2, the fastening means 24 is provided by three elastic pads that are embedded at their base in the extension material and that are elastically engaged beneath the head of the pin 18.

Figure 3:
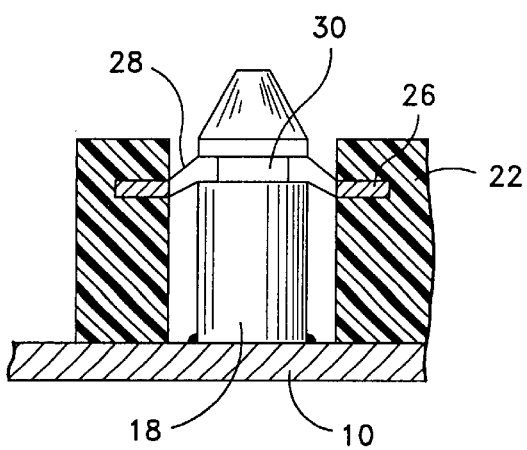
FIG. 3 is a cross sectional view of the arrangement of FIG. 2, with the section plane along an axis of a pin and with a different retaining structure.

In the case shown in FIG. 3, wherein elements corresponding or similar to those of the previous figures have the same reference numbers, fastening is provided via a plate 26. A base of the plate 26 is locked in the extension 22. The plate 26 has two opposite fingers 28 that are elastically engaged in a shank 30 of the pin 18, under the head. As easily seen in FIG. 3, the head of the shank 30 is advantageously conical to facilitate its introduction into the extension hole.

The lower part of the box 20 can be curved, so as to adapt to the curve of the rim 10. However, it is noted that such a solution for mating the box 20 to the rim 10 typically makes it necessary to provide a different type of box for each rim diameter.

Figure 4:
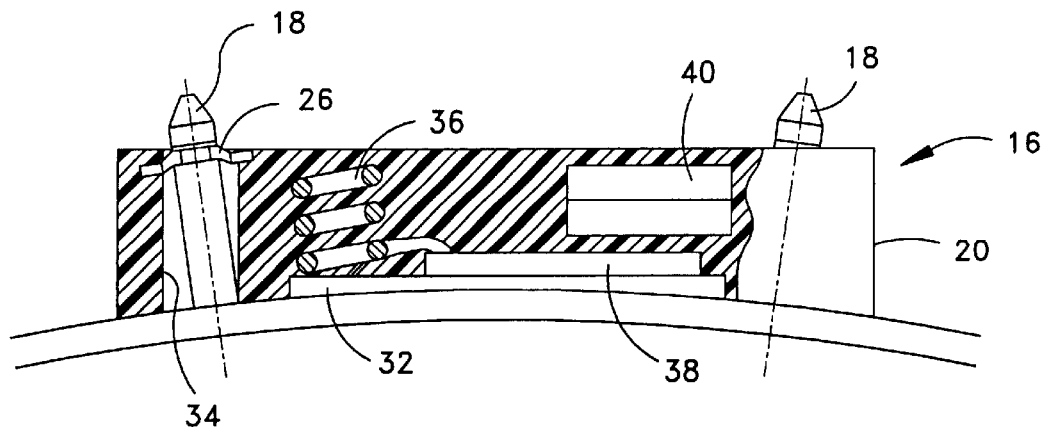
FIG. 4 is a partially broken away view that shows a possible distribution of elements within a housing of the sensor unit.

In the embodiment shown in FIG. 4, wherein elements corresponding or similar to those of the previous figures have the same reference numbers, the lower (i.e., radially inward) portion of the box 20 has a centrally located recess 32 so that only the ends of the box touch the rim 10. The fact that only two ends of the box 20 engage the rim takes into account the fact that the rim is cylindrical.

It is to be noted the embodiment of FIG. 4 can be modified such that the ends of the box 20 are of reduced size compared to the rest of the box, such that the ends of the box are extensions similar to those shown in FIG. 2. It is to be appreciated that the diameter of the rim may be as small as 13 inches in the case of a so-called "compact" vehicle. In general, the length of the sensor unit 16 should not exceed approximately 2.5 inches (e.g., 6 cm).

The holes 34 for receiving the pins 18 have a sufficient dimension in the peripheral direction for letting the pins 18 pass through until the plates 26 click into locking engagement with the pins. The holes 34 can be oblong in the tangential direction of the rim 10 (as shown) for this purpose. As noted, the pins 18 extend generally radially. It should be noted that the pins 18 are located along radial directions to facilitate their connection by means of welding. Thus, the oblong holes allow the pins to be inserted, and allow the insertion without undue force.

The sensory detecting element(s) (e.g., a sensor) and other electronic elements of the sensor unit 16 are generally embedded in the plastic material constituting the housing box 20. In the example shown in FIG. 4, the elements include a detector, an antenna 36 for emitting messages to the exterior link, electronics 38, and a battery 40 (e.g., a coin or button type battery).

Some or all of the elements may be provided in the form of an integrated circuit of specific application or ASIC. The detector can notably be of the capacitor or piezoelectric type, with a form of a computer chip containing a chamber vacuum constituting a pressure reference.

As indicated in FIG. 2, the box 20 can have a protruding space 42 wherein it is possible to house the battery 40. When the internal battery 40 powers the sensor unit 16, the sensor unit is commonly referred to as being an active unit. Generally, if the battery 40 is provided to power the sensor unit 16, a radio frequency between 315 and 915 MHz is used for the communication from the sensor unit 16. Typically, the energy consumed is very low.

The sensor unit 16 can also be of the passive type and receive the necessary energy when operating in the form of an interrogation by radio electrical means located exterior to the tire (e.g., at the vehicle). In this case, the sensor unit 16 has a transponder associated with a temporary energy storage condenser. Circuitry is provided for converting the received interrogation signal into a voltage potential stored on the condenser. For such an embodiment, the energy storage condenser is preferably integrated into the electronics. Also, for such an embodiment, it is preferable to place the antenna 36 outside the box 20. Generally, if the energy to power the sensor unit 16 is derived from an interrogation signal, a frequency between 5 kHz and 15 MHz is used for the communication exchange.

Figure 5:
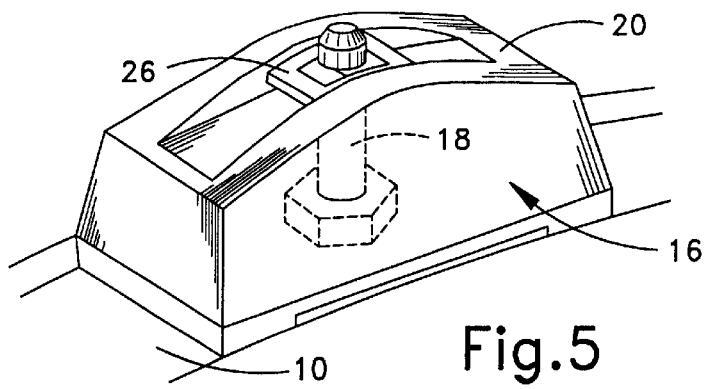
FIG. 5 is a perspective view of a third arrangement in accordance with the present invention.

In the embodiment shown in FIG. 5, wherein elements corresponding or similar to those of the previous figures have the same reference numbers, the box 20 is held by a single, central pin (stud) 18. The box 20 is locked onto the pin 18 by an elastic plate 26 similar to that shown in FIG. 3.

To prevent the box from turning, it can be placed against the side of the rim 10, as shown in FIG. 5. In addition to or as a replacement of the foregoing, the pin 18 and the corresponding hole in the box 20 are configured to mate. The mating between the pin 18 and the box 20 is such that the box is prevented from turning. For example the pin is polygonal, at least at the base, and the hole is correspondingly polygonal. In one example, as indicated schematically in FIG. 5, a six-sided polygonal shape is used, and in another example, a square shape is used.

Figure 6:
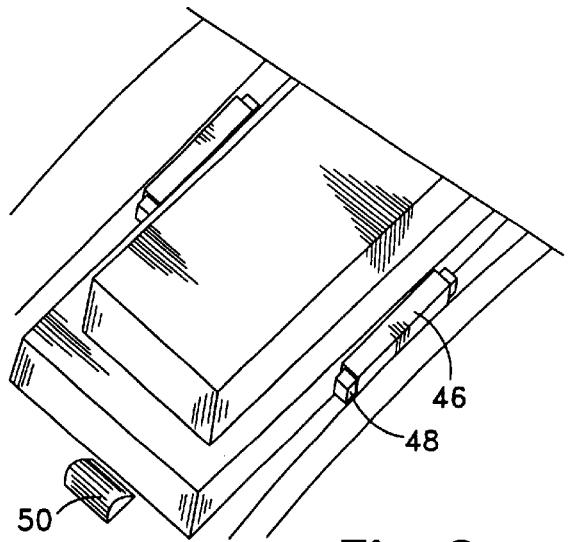
FIG. 6 is a partial perspective view of a fourth arrangement in accordance with the present invention.

FIG. 6 shows yet another embodiment wherein the pins are reduced to slides 46 fastened to the rim 10. The slides (pins) 46 mate with integral tenons 48 of the box 20. Stops are fastened to the rim 10 at locations adjacent to the ends of the box 20. Once the slides 46 are completely engaged with the tenons 48, the box 20, due to its elasticity, is locked between the stops 50.

Figure 7:
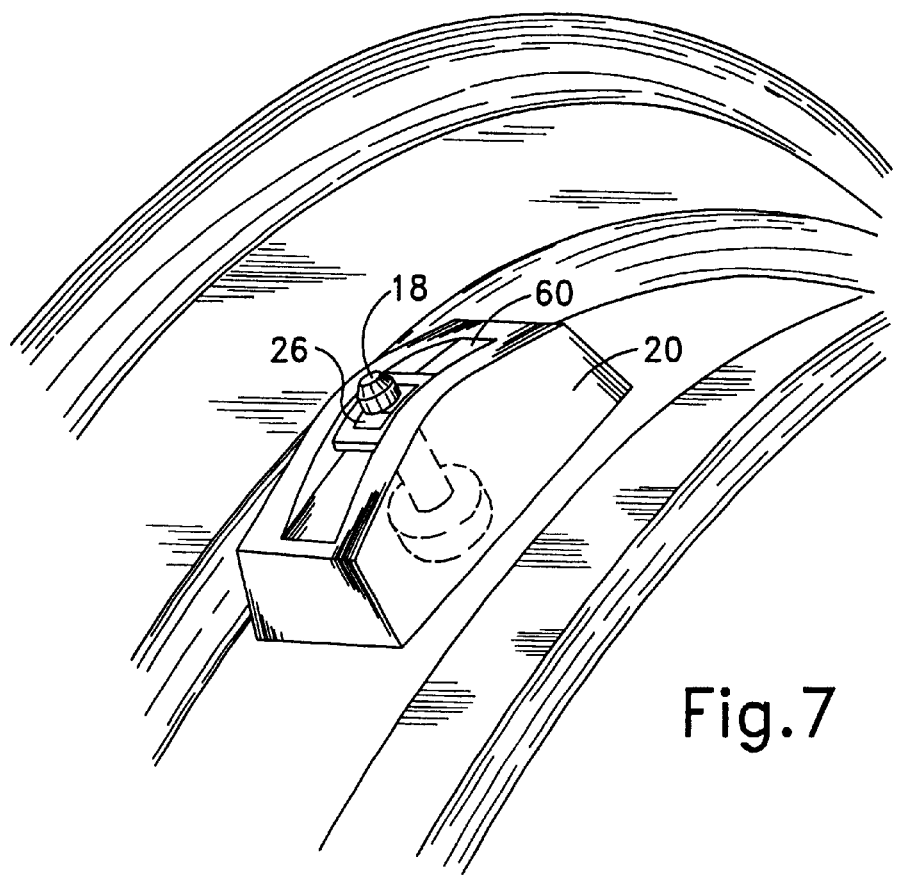
FIG. 7 is a partial perspective view of a fifth arrangement in accordance with the present invention.
Figure 8:
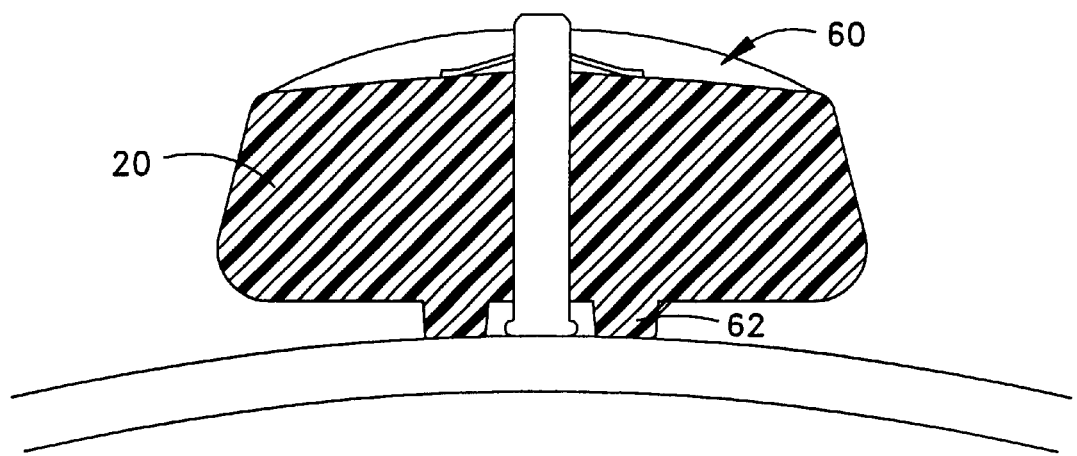
FIG. 8 is a cross view showing the relationship between the housing of the sensor unit, the pin, and the stud of the arrangement of FIG. 7.

The embodiment shown in FIGS. 7 and 8, wherein elements corresponding or similar to those of the previous figures have the same reference numbers. A single, central pin (stud) 18 holds the housing box 20. It is to be noted that the components (e.g., the electronics 38, the antenna 36, and the battery 40) within the housing box 20 are not shown, for simplicity. Accordingly, the section of the housing box 20 merely shows the material (e.g., plastic) of the housing box. It is to be appreciated that the components are present (e.g., embedded into the material of the housing box 20).

The embodiment of FIGS. 7 and 8 is similar to the embodiment of FIG. 5. In particular, the housing box 20 has a recess 60 that extends generally in a tangential direction of the rim 10. An elastic plate or clip 26 is located in the recess 60 and is engaged with the stud pin 18. The clip 26 provides a biasing force that holds and pushed the housing box 20 into engagement with the rim 10.

The embodiment of FIGS. 7 and 8 is different from the embodiment of FIG. 5, in that the box 20 (FIG. 7) does not have a centrally located recess at a lower (i.e., radially inward) portion of the box 20 so that only the ends of the box touch the rim 10. Instead, the box has a circular projection 62 on its lower (i.e., radially inward) portion. The projection 62 encircles the hole through which the stud pin 18 extends. With the projection 62 engaged against the rim 10, the ends of the housing box are spaces away from the rim.

It is to be noted that various types of welding can be utilized to affix the stud pin to the rim. In one preferred method, the stud pin is affixed using welding.

The present invention can be used on cast aluminum (or even magnesium) alloy wheels as well as on rolled steel wheels. In the first case, the rim should be machined after being cast. The pin or pins shall then be butt welded on the rim after the machining phase by one of the processes that are currently well developed on aluminum, such as under inert gas or by melting under an intense electrical current. In the event of a rolled steel wheel, the pins are welded on the rim before being zinc-plated and/or coated with polymer paint, or even on the strip of steel before it is cut, rolled and welded. Butt-welding the pins makes it possible to avoid piercing the rim which would make acceptance difficult due to the degree the rim is weakened (the thickness of the rolled metal is generally on the order of 1.5 mm).

Initially, one would think that the electrical conductivity of the rims, notably those in aluminum-based alloy, and the conductivity of the metal reinforcements placed inside the tires would overly decrease the capacity of message transmission. Practice has shown that this is not the case. The decrease in electrical conductivity is low in the case of a rolled steel rim. In the extreme case of a rim in aluminum and tires whose sides contain metal reinforcements, the decrease does not exceed 30 dB.

From the above description of the invention, those skilled in the art will perceive improvements, changes and modifications. Such improvements, changes and modifications within the skill of the art are intended to be covered by the appended claims.

Having described the invention, the following is claimed:

1. A sensor unit for sensing a physical parameter of a tire mounted on a vehicle wheel rim, said sensor unit comprising:
    an element for detecting the parameter;
    electronics for generating radio frequency messages conveying the value of the parameter;
    an emitting element; and
    an electrical energy source; and
    characterized in that said sensor unit is incorporated in a box placed inside the space delineated by the rim and the tire and is fastened to a pin permanently joined to the rim and protruding toward the inside of the tire.

2. A sensor unit as set forth in claim 1, wherein said box is of an elongated form in the tangential direction of the rim and only bears upon the rim at two end extensions.

3. A sensor unit as set forth in claim 1, wherein said pin is the single pin to which the box is fastened, and said pin passes through a hole in the box.

4. A sensor unit as set forth in claim 3, wherein the cross section of said pin and the cross section of the hole of said box through which said pin passes are mated to prevent said box from turning relative to said pin.

5. A sensor unit as set forth in claim 1, wherein two pins are permanently joined to the rim and protrude toward the inside of the tire, said pins pass through holes in the box, and said box is fastened to said two pins.

6. A sensor unit as set forth in claim 5, wherein said pins are placed radially and said holes through which said pins pass are oblong in shape in the tangential direction of the rim.

7. A sensor unit as set forth in claim 1, wherein said box is held onto said pin via an integral elastic element of said box, said integral elastic element engages a shank of said pin.

8. A sensor unit as set forth in claim 1, wherein said energy source includes a battery.

9. A sensor unit as set forth in claim 1, wherein said energy source includes an electronic energy transformation circuit and a condenser.

10. A sensor unit as set forth in claim 1, wherein said box has a projecting portion and only bears upon the rim at said projecting portion.

11. A sensor unit as set forth in claim 10, wherein said projecting portion encircles said pin.

12. A sensor unit as set forth in claim 11, wherein said box is of an elongated form in the tangential direction of the rim and only bears upon the rim at said projecting portion, with ends of said box being spaced from the rim.

13. A sensor unit as set forth in claim 1, wherein said pin is a stud.

14. A sensor unit as set forth in claim 13, wherein said stud welded to the rim.

15. A sensor unit as set forth in claim 1, wherein said pin is a tenon.

16. An arrangement for provision of vehicle tire sensory information while a tire is mounted on a wheel rim of a vehicle, said arrangement comprising:
    a sensor unit including a tire condition sensor, a signal transmitter, and a housing that contains said sensor and said transmitter, said housing having a mounting hole;
    a stud welded to the rim and extending into the space bounded between the tire and the rim, said stud extending through said mounting hole of said sensor housing; and
    a retainer extending between said sensor housing and said stud such that said sensor housing is held fixed relative to said stud.

17. An arrangement as set forth in claim 16, wherein said retainer is a resilient bias member.

18. An arrangement as set forth in claim 16, wherein said retainer is a resilient clip.

19. An arrangement as set forth in claim 16, wherein said stud has a recess, and said retainer engages said stud at said recess.

20. An arrangement as set forth in claim 16, wherein said housing has a recess, and said retainer engages said stud at said recess.

21. An arrangement as set forth in claim 20, wherein said housing has a recess, and said retainer engages said stud at said recess.

22. An arrangement as set forth in claim 16, wherein the cross section of said stud and the cross section of said mounting hole are mated to prevent said housing from turning relative to said stud.

23. An arrangement as set forth in claim 16, wherein said stud is a first stud and said mounting hole is a first hole, said arrangement including a second stud welded to the rim and extending into the space bounded between the tire and the rim, said housing including a second mounting hole, said second stud extending through said second mounting hole of said sensor housing.

24. An arrangement as set forth in claim 23, wherein said first and second studs extend along radial directions of the tire and rim, said first and second holes are oblong in shape in the tangential direction of the rim.

25. An arrangement as set forth in claim 23, wherein said housing includes a circular projection that encircles the mounting hole and the stub, and that engages the rim.

26. A method of attaching a tire condition sensor unit, which senses a tire condition parameter and which transmits a signal indicative of the sensed parameter, to a rim of a vehicle tire assembly, said method comprising:

welding a stud directly to the rim to extend into a space bounded by the rim and a tire of the tire assembly;

locating the tire condition sensor unit adjacent to the welded stud; and engaging a retaining component between the welded stud and the tire condition sensor unit.

27. A method as set forth in claim 26, wherein said step of welding the stud includes resistance welding the stud to the rim.

28. A method as set forth in claim 26, wherein said step of engaging a retaining component between the welded stud and the tire condition sensor unit includes engaging the retaining component to a shank of the welded stud and engaging the retaining component to the tire condition sensor unit such that the retaining clip presses the tire condition sensor unit toward the rim.

29. A method as set forth in claim 26, wherein said step of locating the tire condition sensor unit adjacent to the welded stud includes placing the stud through a hole of the tire condition sensor unit.

30. A method as set forth in claim 26, including welding a second stud directly to the rim to extend into the space bounded by the rim and the tire of the tire assembly, locating the tire condition sensor unit adjacent to the second welded stud, and engaging a second retaining component between the welded stud and the tire condition sensor unit.

31. A method as set forth in claim 30, wherein said step of locating the tire condition sensor unit adjacent to the second welded stud includes placing the second stud through a hole of the tire condition sensor unit.

32. A method as set forth in claim 26, including engaging the tire condition sensor unit against the rim.

33. A method as set forth in claim 32, wherein said step of engaging the tire condition sensor unit against the rim includes engaging only two ends of an elongate housing of the tire condition sensor unit against the rim.

34. A method as set forth in claim 32, wherein said step of engaging the tire condition sensor unit against the rim includes engaging only a circular projection of a housing of the tire condition sensor unit against the rim, with ends of the housing being spaced from the rim.

* * * * *